April 1, 1941.  C. C. OBERLY  2,236,731
DISPENSING DEVICE
Filed March 8, 1939   2 Sheets-Sheet 1
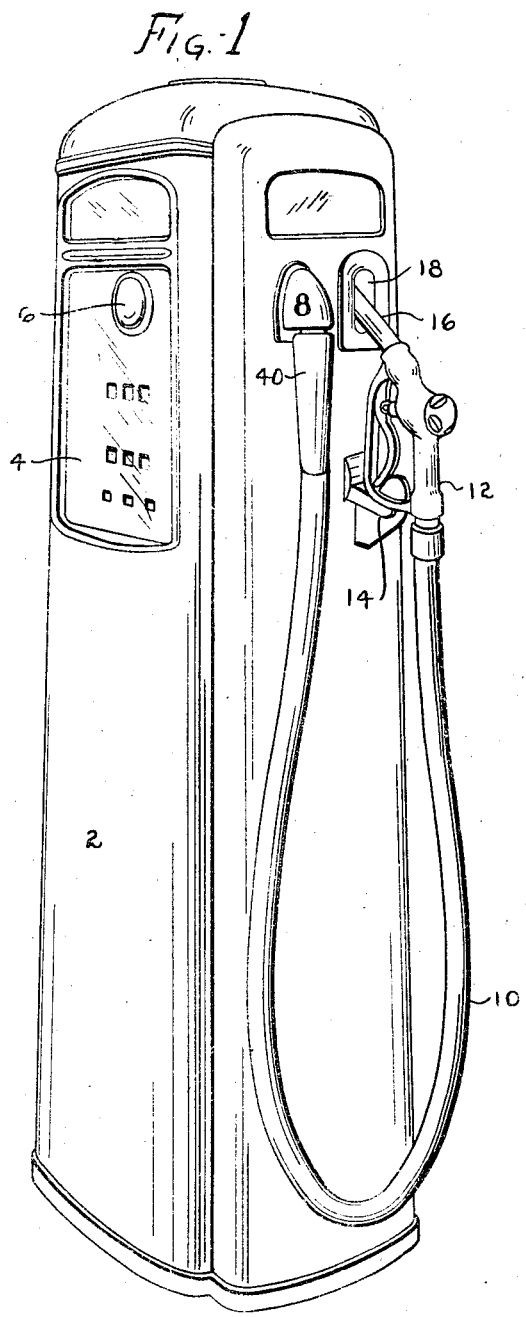
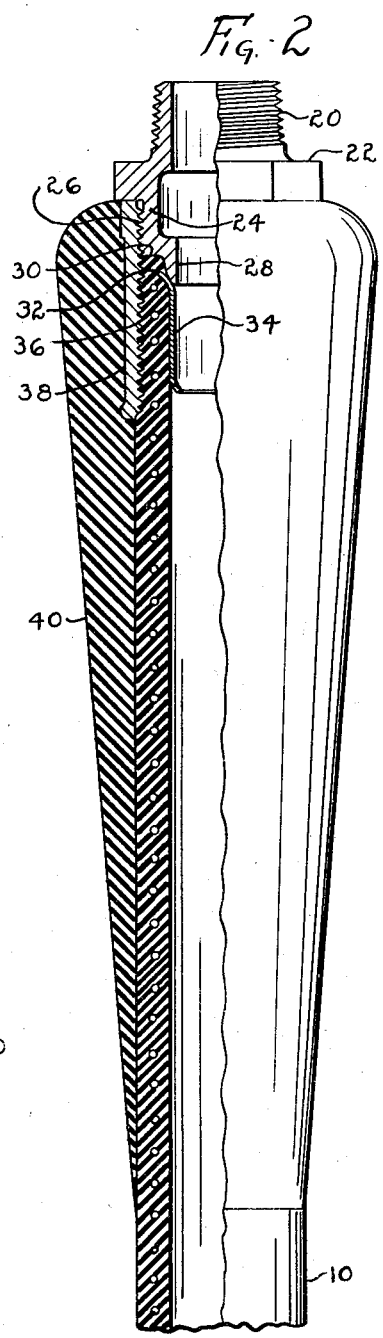
INVENTOR.
Chester C. Oberly
BY: Cox & Moore
ATTORNEYS.

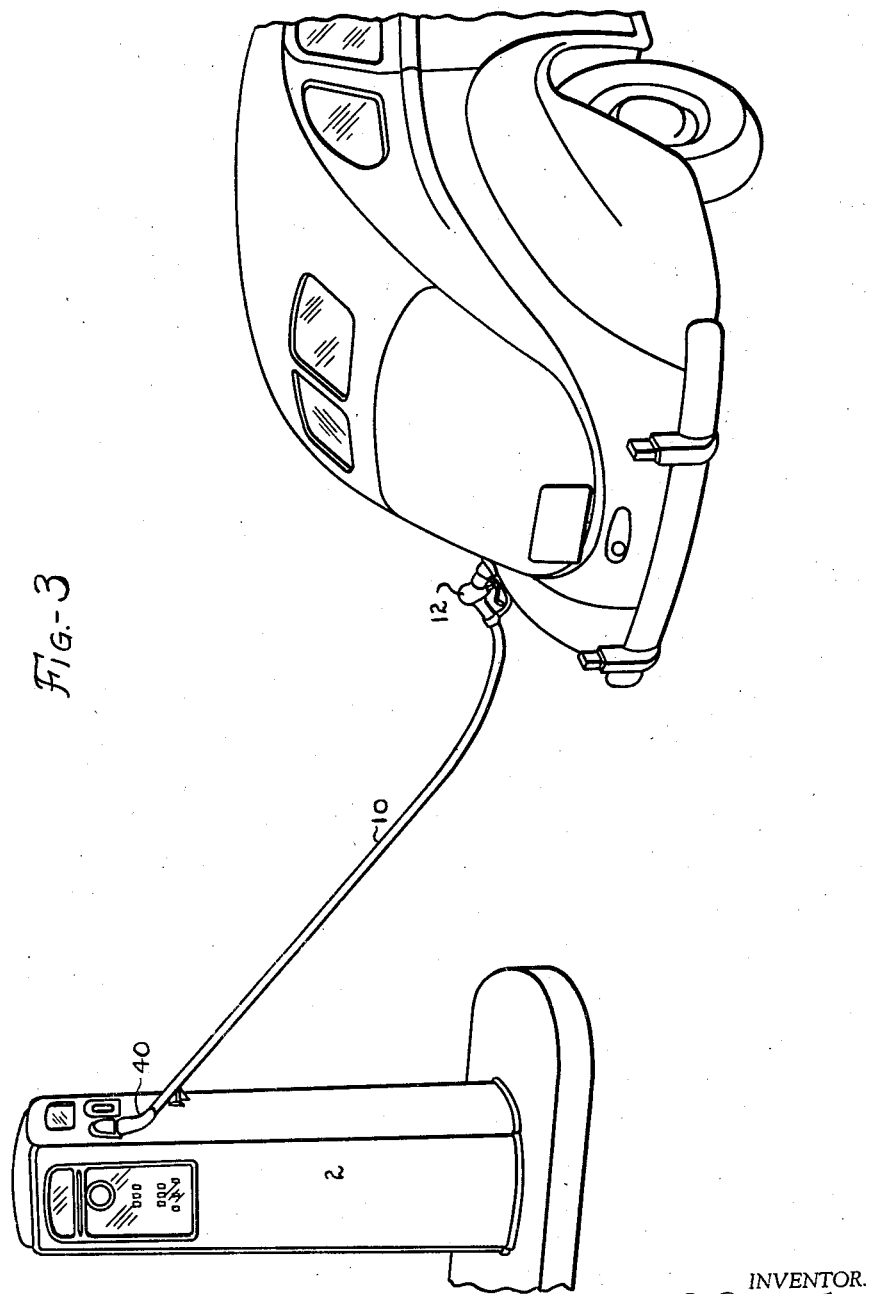

Patented Apr. 1, 1941

2,236,731

UNITED STATES PATENT OFFICE 2,236,731

DISPENSING DEVICE

Chester C. Oberly, Fort Wayne, Ind., assignor to Tokheim Oil Tank and Pump Company, Fort Wayne, Ind., a corporation of Indiana Application March 8, 1939, Serial No. 260,642

1 Claim. (Cl. 138—61)

This invention relates to dispensing devices and more particularly to flexible hose constructions for dispensing devices.

The invention in particular relates to dispensing devices for gasoline or other motor fuel. The hose construction is shown in connection with a conventional service station pump.

In the dispensing of motor fuel, many times a customer does not or cannot drive very close to the pump stand so that all the available length of the conventional flexible hose is required to reach the fill pipe of the automobile tank. Under such circumstances an undue strain is applied to the hose due to the acute bend directly at the coupling.

The object of the present invention is to eliminate the acute bending which takes place between the end of the flexible portion of the hose and its attached rigid coupling which connects the hose to the dispensing line of the pump whereby to preserve the life of the hose.

Referring now to the attached drawings for a more complete understanding of the invention, Fig. 1 shows how my invention is applied to the conventional hose of a gasoline or motor fuel dispensing device;

Fig. 2 is a full-sized view, partially in section, of a dispensing hose having the invention applied thereto; and Fig. 3 shows one of the conditions experienced in dispensing gasoline which necessitates the present invention.

In the accompanying explication of the invention, it has been illustrated as applied to a gasoline service station pump; it is equally clear that such adaptation is but illustrative and not by way of limitation. In Fig. 1 of the drawings there is shown the usual type of upstanding housing 2 which encloses the main elements of the service station pump, including, as is well known in the art, the rigid portion of the dispensing line, having a connection with the usual underground tank containing the motor fuel to be dispensed.

Within this upstanding housing 2 and connected in the dispensing line is the usual motor driven pump which is adapted to draw the liquid from the underground tank and force it through the dispensing line when the dispensing valve, usually the nozzle valve, is open. In addition the housing encloses the air release mechanism, the meter, and the registering mechanism. The dial of the registering means is shown at 4. After flowing through the meter, not shown, and the sight glass 6, the liquid being dispensed flows through that portion of the dispensing line which projects outwardly through the housing as at 8.

The flexible hose forming the subject matter of the present invention, both as an article of manufacture and also in combination with the liquid dispensing device, is adapted to be attached to the terminal 8 of the flow line projecting from the housing. The hose is formed of any desirable material which will provide flexibility so as to permit the hose to be bent to desired shape to accommodate various dispensing positions and distances. I have illustrated the hose as formed of rubber covered material, preferably rubber covered fabric. The construction of the material of the hose may be conventional as is well known in the art. I prefer, however, a rubber covered hose. In general the hose is about ten feet in length, although any desired length may be utilized.

The outer end of the hose 10 is provided with the conventional valved control nozzle 12, which when the hose is not in use is supported by the conventional hose support 14 mounted on the housing 2. The dispensing end of the hose is shown at 16 as extending into an aperture 18 of the housing. When ready for use, the nozzle is removed from its support and is carried by the attendant to the automobile for insertion in the fill pipe of the gasoline tank, or other tank to be filled.

Fig. 3 shows a typical situation wherein a motorist has approached the maximum distance from the service station pump and at which distance the automobile tank can be filled. In such a situation it is necessary to pull and stretch the hose to a maximum so that an undue strain is applied to that portion of the hose which connects the material of the hose with the metal or rigid coupling portion of the hose which connects the hose to the service station pump. This is due to the acute bend imposed upon the hose directly at its coupling connection.

Fig. 2 shows in full size the construction of that end of the hose which connects with its coupling and the manner in which the junction of the end of the hose and its coupling is reinforced to eliminate these objectionable acute bends and whereby to relieve the hose of excessive stresses which in time cause them to check, crack or break, causing leakage.

My present invention provides a reinforcement extending substantially along the hose from the coupling and the construction is such as to equally distribute the stress along the hose and to prevent the pulling of the hose at an acute angle at the coupling.

In the specific embodiment of the invention, the hose 10 is provided with any type of coupling for attachment to the terminal 8 of that portion of the dispensing line within the housing. The coupling which is here used for purposes of illustration comprises the coupling portion 20, threaded externally and extending outwardly from the flange 22. On the other side of the flange, the coupling is provided with a sleeved portion 24 which is externally threaded as at 26 and with a sleeve extension 28 forming a shoulder 30. The end of the hose overlies the sleeve extension and rests against the shoulder 30 in the manner shown. The end of the hose 10 is gripped between the outturned flange 32 of the internal metal bushing 34 and the threads 36 of the collar nut 38 which is threaded to the threads of the sleeve portion 24 of the coupling.

The invention comprises suitably reinforcing the assembly of the hose and its coupling in a manner to prevent acute bends thereat. This is accomplished by providing in the embodiment illustrated, a conical sleeve of rubber-containing material or synthetic rubber. By rubber-containing is meant any material having the vulcanizing and elastic or resilient qualities of rubber.

After the hose and coupling are properly assembled, they are placed in a suitable mold and the conical sleeve 40 of rubber or other suitable material is vulcanized to both the hose and the overlying portion of the coupling. The conical sleeve is arranged so that the thickest part is at the junction of the hose and coupling and so that the sleeve tapers progressively in decreasing cross sectional thickness along the length of the hose in a direction away from the coupling. The thickest end of the sleeve lies against the flange and overlies the collar nut completely. The sleeve is vulcanized to the outer surface of this collar nut and to the adjacent outer surface of the hose as shown. This makes the entire assembly a complete unit, each part being integrally united to the other.

The thickness and length of the sleeve is selected so as to equally distribute the stresses along the sleeve and to prevent acute bending. The selected proportions and dimensions are preferable, but the invention is not restricted thereto. It is understood that the invention is capable of modification within the scope of the appended claim.

The invention is hereby claimed as follows:

A dispensing hose of flexible rubber-like material for use in connection with a fluid dispensing device, said hose having an annular wall of relatively large diameter, a rigid collar nut disposed about said hose at the extremity thereof and adapted for interengagement with a coupling on said dispensing device, and a substantially conically shaped sleeve of rubber-like material extending from said extremity of the hose to a point substantially spaced from the extremity, said sleeve having its major diametral portion disposed at the end of said hose and embracing said rigid collar, and said sleeve being integrally vulcanized to the outer surface of said hose and to the outer surface of said collar throughout its entire length to prevent acute bending of the hose adjacent the coupling.

CHESTER C. OBERLY.